United States Patent
Chakravarty (10) Patent No.: US 9,313,375 B1
(45) Date of Patent: Apr. 12, 2016

(54) SOFTWARE-IMPLEMENTED GRADUATED NEUTRAL DENSITY FILTER FOR BALANCING EXPOSURE OF A PHOTOGRAPH

(71) Applicant: Amazon Technologies, Inc., Reno, NV (US)

(72) Inventor: Bodhisatwa Chakravarty, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 4 days.

(21) Appl. No.: 14/295,046

(22) Filed: Jun. 3, 2014

(51) Int. Cl.
| H04N 5/217 | (2011.01) |
| H04N 5/235 | (2006.01) |
| H04N 5/232 | (2006.01) |
| H04N 5/238 | (2006.01) |

(52) U.S. Cl.
CPC ............ *H04N 5/2175* (2013.01); *H04N 5/238* (2013.01); *H04N 5/2351* (2013.01); *H04N 5/2353* (2013.01); *H04N 5/23216* (2013.01); *H04N 5/23293* (2013.01)

(58) Field of Classification Search
CPC .......... H04N 5/23212; H04N 5/23216; H04N 5/23229; H04N 5/235–5/2353
See application file for complete search history.

(56) References Cited

U.S. PATENT DOCUMENTS

| 6,864,916 | B1 * | 3/2005 | Nayar | H04N 5/2355 348/224.1 |
| 8,447,132 | B1 * | 5/2013 | Galil | G06K 9/00228 358/1.9 |
| 2003/0107720 | A1 * | 6/2003 | Maltabes | G03F 7/70066 355/77 |
| 2007/0242141 | A1 | 10/2007 | Ciurea | |
| 2009/0278957 | A1 * | 11/2009 | Tanaka | G06T 5/007 348/229.1 |
| 2013/0147979 | A1 * | 6/2013 | McMahon | H04N 5/335 348/218.1 |
| 2015/0077581 | A1 * | 3/2015 | Baltz | H04N 5/2353 348/218.1 |
| 2015/0207973 | A1 * | 7/2015 | Iwasaki | H04N 5/2352 348/229.1 |

OTHER PUBLICATIONS

Sawyer, Peter 2011. "Quick Tip: Replicate a Graduated Neutral Density Filter in Photoshop," http://photography.tutsplus.com/tutorials/quick-tip-replicate-a-graduated-neutral-density-filter-in-photoshop--photo-4888.
Odell, Jason P. 2012. "Color Efex Pro 4," https://www.youtube.com/watch?v=Mw2MWSWwdXw&noredirect=1.
Vignette "Filter Examples," Weaver & Studios http://vignette.weavr.co.uk/filter-examples.

* cited by examiner

*Primary Examiner* — Timothy J Henn
(74) *Attorney, Agent, or Firm* — Weaver Austin Villeneuve & Sampson LLP (57) ABSTRACT

Techniques are described for balancing an exposure of a photograph using a software-implemented Graduated Neutral Density (GND) filter. Portions of a visual representation of a scene may be defined. Camera settings, such as aperture and/or shutter speed, may be set based on characteristics of the software-implemented GND filter and the portions of the visual representation of the scene.

20 Claims, 10 Drawing Sheets

SOFTWARE-IMPLEMENTED GRADUATED NEUTRAL DENSITY FILTER FOR BALANCING EXPOSURE OF A PHOTOGRAPH

BACKGROUND

The difference in lighting between portions of a scene to be photographed is a factor that affects exposure. For example, a scene such as a sunset at a beach can have a significant difference in lighting between the sky in the background and the beach in the foreground. Often, the bright sun can "wash out" and cause a loss of detail of various objects in a photograph of the scene, such as clouds in the sky. This is due to the fact that an overly-bright portion of the scene, when compared to a more darkly lit portion of the scene, can exceed the dynamic range of a camera's sensor or film. As a result, when the scene is captured in a photograph detail may be lost.

Photographers often use graduated neutral density (GND) filters to adjust the overly-bright portion of scenes to be within the dynamic range of their film or sensor. For example, a GND filter can be physically placed on the lens of the camera. The GND filter can have a region that can darken the portion of the scene in the field of view of the camera lens such that the scene can be within the dynamic range of the camera, and therefore, the photograph of the scene with a proper exposure can be captured. Accordingly, visual details that were previously washed out may be visible in the photograph. However, because the characteristics of a physical GND filter are typically fixed, they may not be useful for many applications or devices.

DETAILED DESCRIPTION

This disclosure describes software techniques for emulating the effects of a graduated neutral density (GND) filter for balancing exposure of a photograph. For example, a visual representation of a scene to be photographed may be displayed on an electronic device. A variety of options to emulate, in software on the electronic device, the functionality of a physical GND filter are provided to a user. In particular, the user can define portions of the visual representation of the scene to be affected by a software-implemented GND filter. A variety of other options, such as the type of GND filter and its power, may also be selected by the user. As the user specifies the characteristics of the software-implemented GND filter, the displayed scene is modified to provide a preview of what a photograph of the scene may look like. Once the user is satisfied with the displayed scene, camera aperture and/or shutter speed settings are generated based on the specified characteristics of the software-implemented GND filter. A photograph of the scene is then captured based on these aperture and shutter speed settings to provide a photograph a more balanced exposure.

Figure 1:
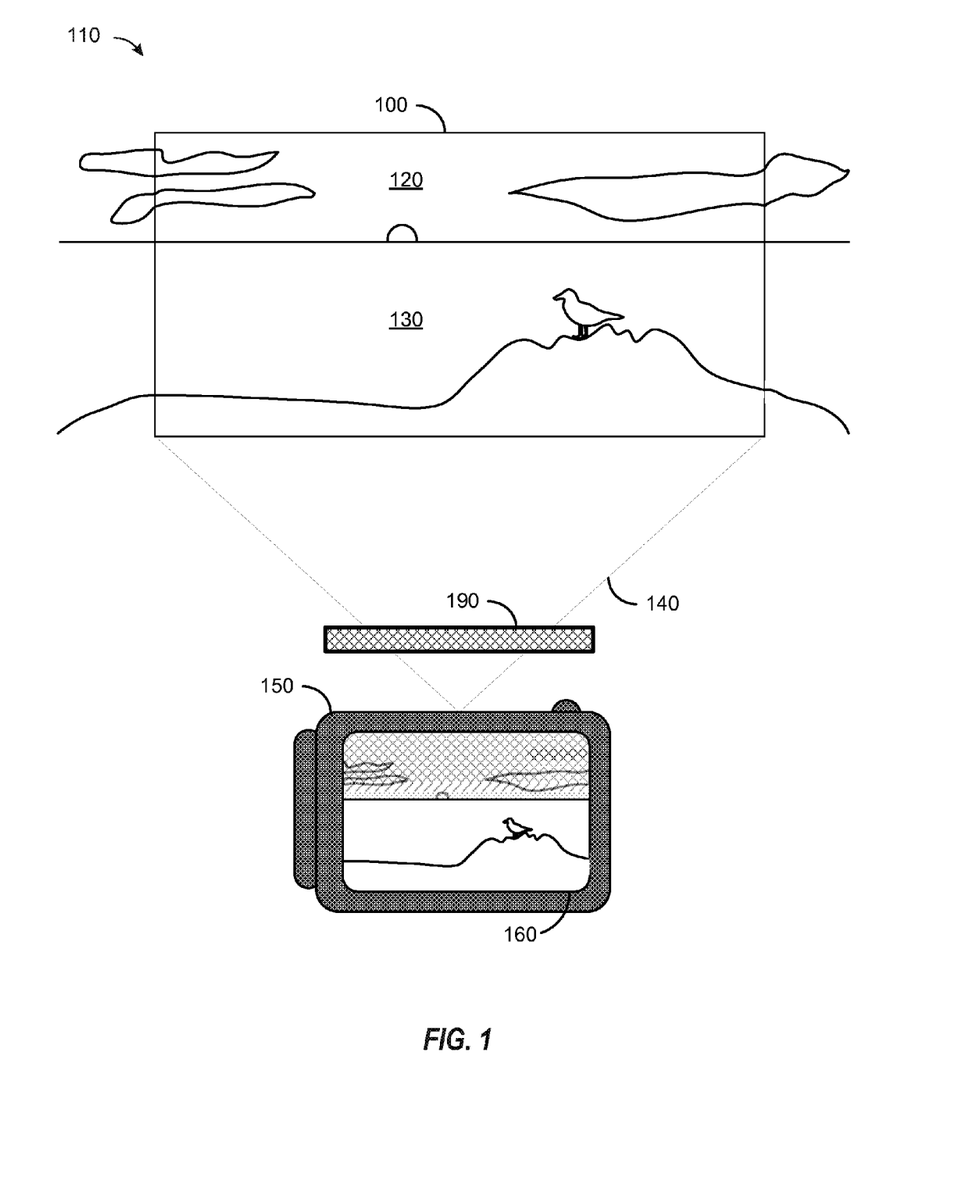
FIG. 1 illustrates use of a physical GND filter.

FIG. 1 illustrates a scene which can be captured in a photograph by an electronic device. Scene 100 is a portion of environment 110 within field of view 140 of a camera lens of electronic device 150. Visual representation 160 (also referred to herein as the displayed scene) is a depiction of scene 100 on a display of electronic device 150. Electronic device 150 may be a mobile device such as a smartphone, point-and-shoot camera, digital single lens reflex (SLR) camera, laptop, wearable electronic device (e.g., a smartwatch), tablet, or other device. Scene 100 is a sunset at a beach. Background 120 includes a sun and clouds. Foreground 130 includes a shoreline and a seagull. Because the sun is in the background, a difference in lighting between the background and foreground may exceed the dynamic range of the image capture system of electronic device 150 and cause a loss of detail in a photograph of scene 100.

For example, a photograph of scene 100 can brighten up the shoreline and seagull in foreground 130, but the bright sun in background 120 can wash out and cause a loss of detail of objects in the sky (e.g., the clouds). Alternatively, background 120 may be darkened in a photograph of scene 100, but the shoreline and seagull in foreground 130 may be too dark (i.e., not enough light is provided), and therefore indistinguishable. If too much light is provided to an image capture system of electronic device 150, the photograph of scene 100 is overexposed. If not enough light is provided the photograph is underexposed.

FIG. 1 also shows a conventional GND filter 201 which provides effects that can be emulated in FIG. 2 and are disclosed elsewhere herein. In FIG. 1, a conventional GND filter 190 may be physically placed in field of vision 140 (i.e., in between the camera lens and scene 100), reducing the difference in brightness between background 120 and foreground 130 as shown in visual representation 160 on the display of device 150 (depicted as a digital SLR camera in FIG. 1). In particular, physical GND filter 190 is placed in field of vision 140 such that background 120 is covered by the light-modifying portion of GND filter 190. That is, in the depicted example, the light-modifying portion of physical GND filter 190 is rectangular-shaped and sized and positioned to cover only background 120. Foreground 130 is unaffected by physical GND filter 190 (being covered by a transparent portion of GND filter 190). When viewed by the image capture system of electronic device 150, background 120 is darkened such that scene 100 appears to be within the dynamic range of the image capture system. When the scene is captured in a photograph and stored on electronic device 150, the resulting photograph may preserve visual detail that would otherwise be lost if the photograph was taken without the use of physical GND filter 190.

While a physical GND filter may prove effective for some circumstances and devices, different scenes may require different types of GND filters. For example, one scene may need a more powerful GND filter than another scene. Moreover, the photographer may wish to try different types of GND filters on the same scene. Additionally, the size and shape of the portion to be adjusted with the GND filter may also change from scene-to-scene. Furthermore, when using a physical GND filter, a photographer may still need to adjust camera settings (e.g., aperture and shutter speed) to provide the intended exposure results in conjunction with the GND filter. Exposure may be based on aperture (i.e., the size of the opening of the camera lens allowing light in) and shutter speed (i.e., the length of time the camera's shutter is open to capture a photograph of a scene).

As an alternative to a physical GND filter, the photographer can use high dynamic-range (HDR) imaging. HDR is a technique that involves taking multiple photographs of the scene at different exposures. The multiple photographs are then combined to form a single photograph. Different portions of the combined, single photograph can be from different photographs. However, HDR may not provide a natural-looking photograph, take more time as several photographs are required to be captured, and have alignment issues if a tripod is not used to take the multiple photographs.

As another option, a photograph may be modified in post-processing with a photo editing software program. However, the photo editing program can only work with the provided data of the photograph which, if it includes washed out features, may include a loss of visual detail that may not be regained through processing the photograph with the photo editing software program.

According to various implementations, software-implemented GND filters as described herein may be employed to achieve a similar effect without the need for the use of a physical GND filter. Because of the flexibility with which it may be configured, a software-implemented GND filter eliminates the need to carry a variety of different physical GND filters to accommodate photographing different scenes. Additionally, a software-implemented GND filter also provides more flexibility and precision for applying a GND filter to portions of the scene to be photographed. For example, a software-implemented GND filter can provide substantially the same effect as the physical GND filter in FIG. 1, multiple GND filters, and/or different sizes, shapes, and orientations of GND filters. Moreover, software-implemented GND filters may make photography easier by determining the camera settings (e.g., aperture and/or shutter speed) needed based on the use of the software-implemented GND filter.

Figure 2A:
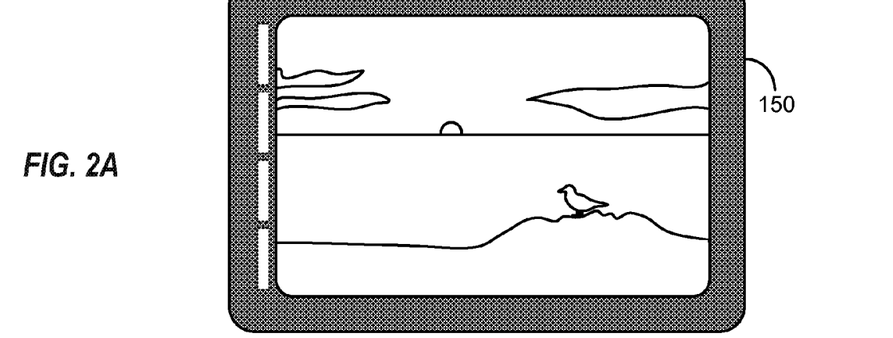
FIGS. 2A, 2B, and 2C illustrate definition of a software-implemented GND filter in accordance with particular implementations.
Figure 2B:
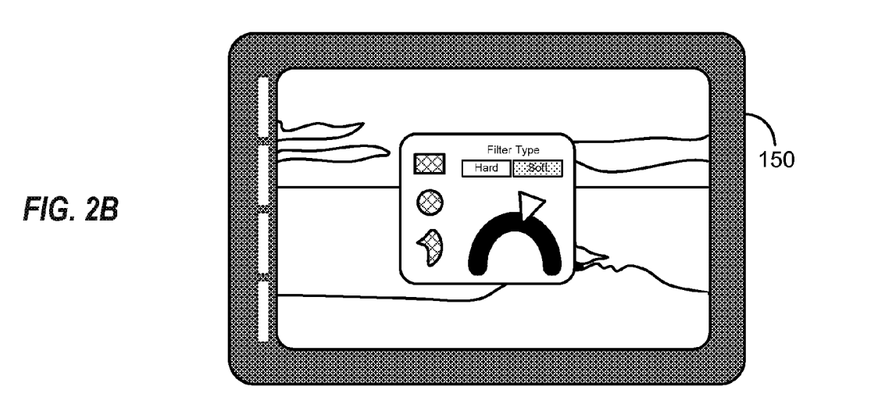
Figure 2C:
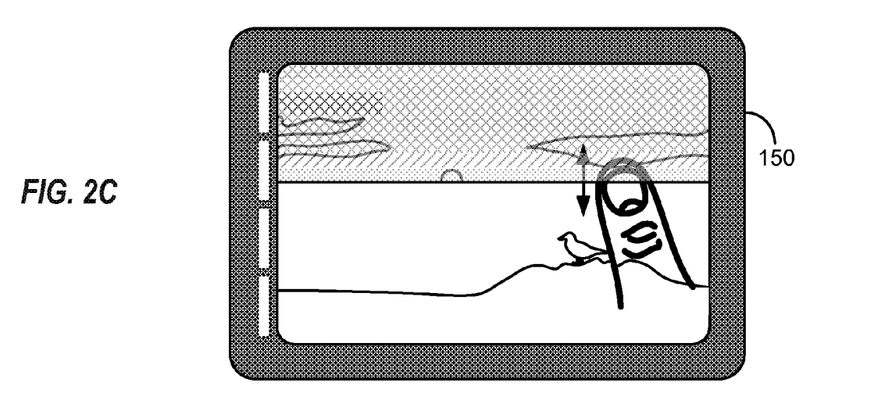

FIGS. 2A, 2B, and 2C illustrate definition of a software-implemented GND filter in accordance with particular implementations. In FIG. 2A, a visual representation of a scene is displayed on electronic device 150. As the user moves electronic device 150 to frame the scene appropriately, the displayed scene updates in real-time to provide the current view from the field of view of the image capture system of electronic device 150. However, as previously discussed, a photograph of the scene may be washed out and lose visual detail.

As shown in FIG. 2B, the user can invoke a function to provide a GUI for accessing a software-implemented GND filter function. Using the GUI, the user can select or define a portion of the visual representation of the scene (i.e., the displayed scene) that is overly-bright, the filter type, and the power of the filter. As shown in FIG. 2C, the user can adjust a portion of the displayed scene, for example, by adjusting its shape, size, and/or orientation, e.g., by manipulating the portion of the displayed scene on the touchscreen of electronic device 150. As the characteristics of the software-implemented GND filter are defined, the displayed scene may also update in real-time to allow for a preview of what the photograph of the scene will look like. The photograph can be captured using camera settings that are generated from light measurements that are, in turn, modified based on the defined characteristics of the software-implemented GND filter. As a result, the captured photograph may maintain visual detail that would otherwise be lost.

Figure 3:
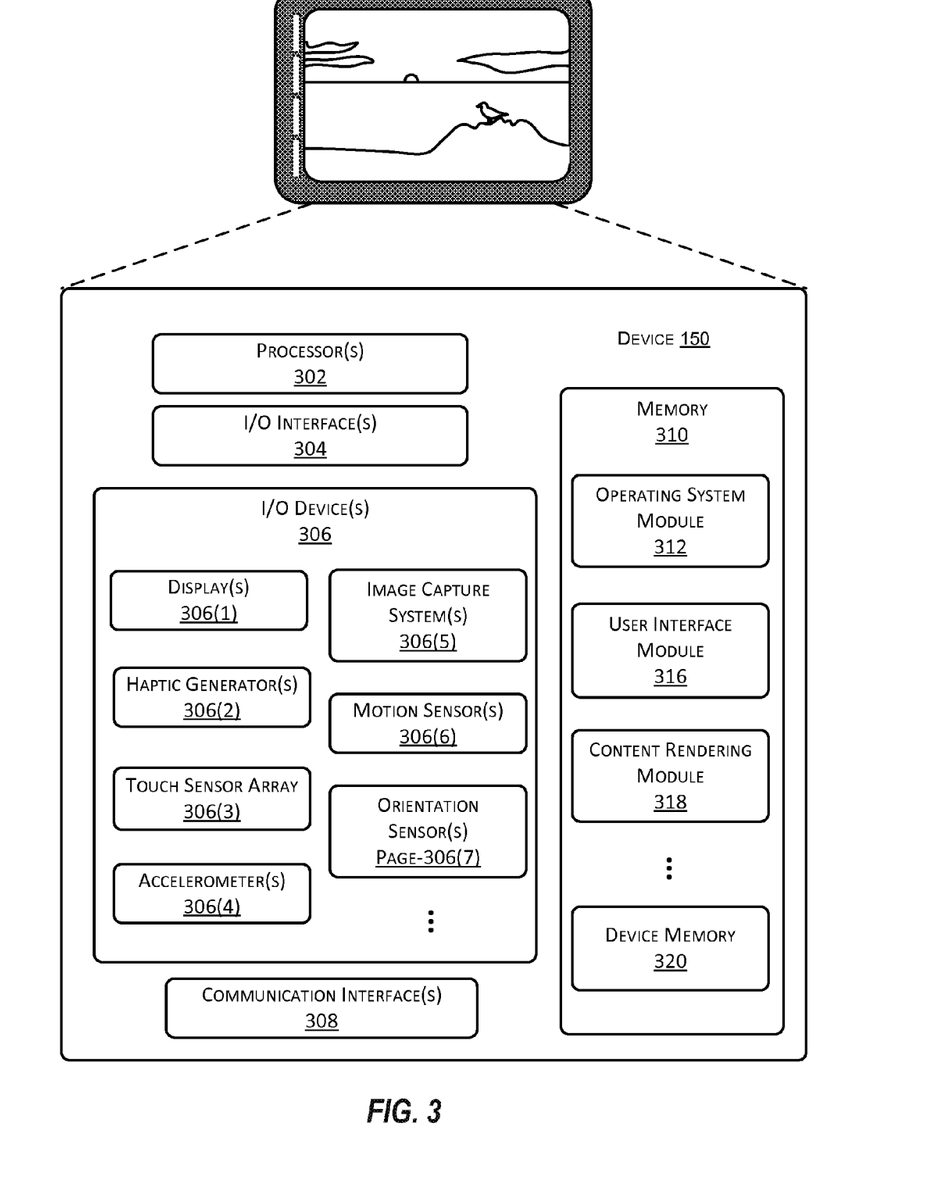
FIG. 3 is a simplified block diagram of an example of an electronic device which may be used with particular implementations.

A block diagram of an example of an electronic device 150 in which implementations of the invention may be practiced is shown in FIG. 3. Device 150 includes one or more single or multi-core processors 302 configured to execute stored instructions (e.g., in device memory 320). Device 150 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface, and so forth. I/O interface(s) 304 is coupled to one or more I/O devices 306. The I/O device(s) 306 may include one or more displays 306(1), one or more haptic generators 306(2), a touch sensor array 306(3), one or more accelerometers 306(4), one or more image capture systems 306(5), one or more motion sensors 306(6), one or more orientation sensors 306(7), microphones, speakers, and so forth. The one or more displays 306(1) are configured to provide visual output to the user and may comprise any of a variety of display types including, for example, any type of reflective or transmissive display. Touch sensor array 306(3) may be a capacitive sensor array having a matrix of conductors that are scanned to determine, for example, the location, duration, speed and direction of touch events within the matrix based on changes in electrical capacitance.

The one or more image capture systems 306(5) include an image sensor (e.g., charge-coupled devices (CCDs), complementary metal-oxide-semiconductor (CMOS) active pixel sensors, etc.), camera lens, mirrors, digital signal processors (DSPs), and/or other components to capture scenes as photographs. Image capture systems 306(5) may also provide a displayed scene on display 306(1).

Device 150 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 150 also includes one or more buses or other internal communications hardware or software that allow for the transfer of data and instructions between the various modules and components of the device.

Device 150 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 150. Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, and other modules.

User interface module 316 is configured to present a user interface to the user that may include visual, audible, and/or haptic components. For example, user interface module 316 may be configured to present, in conjunction with content rendering module 318, an image on display 306(1). User interface module 316 may also be configured to process inputs of applied forces (e.g., touch events, swipes, etc.) at particular locations on the display to take particular actions. Rendering module 318 is configured to process image data for presentation on display 306(1).

Memory 310 also includes device memory 320 to store a wide variety of instructions and information using any of a variety of formats including, for example, flat files, databases, linked lists, trees, or other data structures. Such information includes content for rendering and display on display 306(1). In some implementations, a portion of device memory 320 may be distributed across one or more other devices including servers, network attached storage devices, and so forth.

Computer program instructions used to provide the techniques described herein may be implemented in a variety of ways. For example, they could be part of the native display controller logic of device 150. Alternatively, they could be implemented as a separate application (from the content provider, a device provider, or any other third party) that may be downloaded to the device. In another alternative, where device 150 is a thin client, at least some of the instructions may be hosted on a remote platform. Suitable alternatives will be apparent to those of skill in the art. It will also be understood that device 150 of FIG. 3 is merely an example of a device with which various implementations of the present invention may be practiced, and that a wide variety of other devices types may also be used. The scope of the invention should therefore not be limited by reference to device-specific details discussed above.

Figure 4:
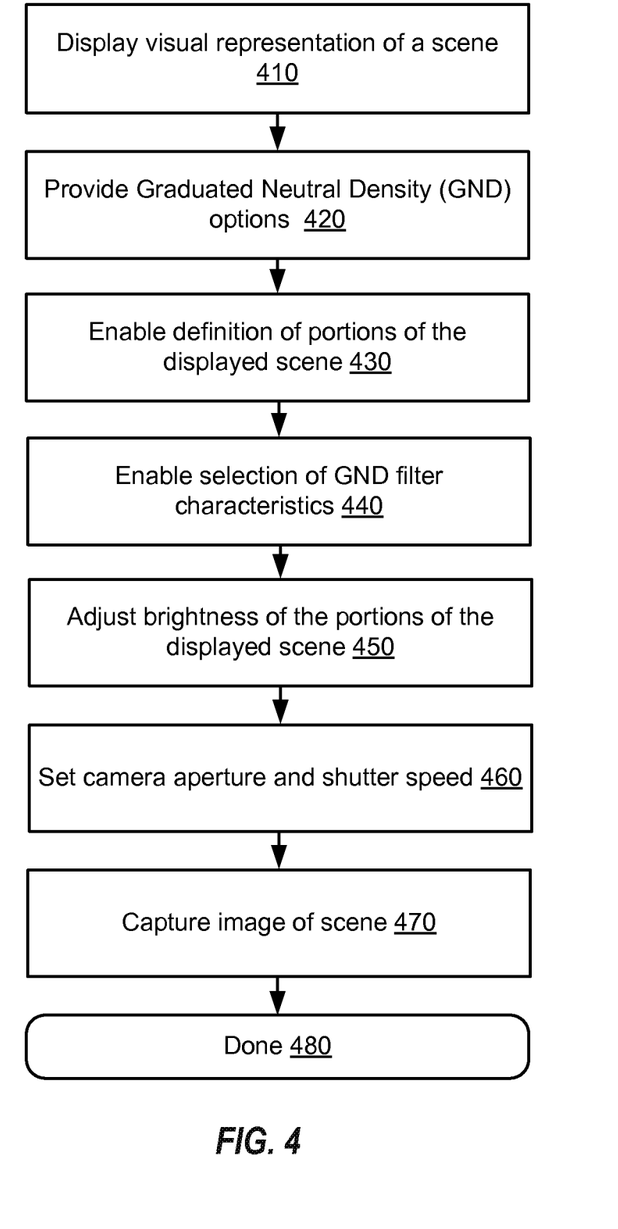
FIG. 4 is a flowchart illustrating operation of a particular implementation.

FIG. 4 is a flowchart illustrating operation of a particular implementation. In particular, the flowchart of FIG. 4 illustrates a method for balancing exposure of a photograph using a software-implemented GND filter. The method in FIG. 4 provides a visual representation of a scene on a display (i.e., the displayed scene) of an electronic device (e.g., device 150), provides software-implemented GND filter options which allow a user to specify characteristics of a software-implemented GND filter and selects portion(s) of the displayed scene, and generates camera aperture and/or shutter speed settings to capture a photographic image of the scene based on the placement of the portions of the displayed scene and the software-implemented GND filter characteristics.

As shown in block 410 of FIG. 4, a visual representation of a scene is displayed. For example, in FIG. 1, scene 100 is a portion of environment 110 within field of view 140 of a camera lens of electronic device 150 and captured by image capture system(s) 306(5) of electronic device 150. Visual representation 160 of scene 100 (i.e., the displayed scene) may be depicted in real-time on a display of electronic device 150.

Figure 5:
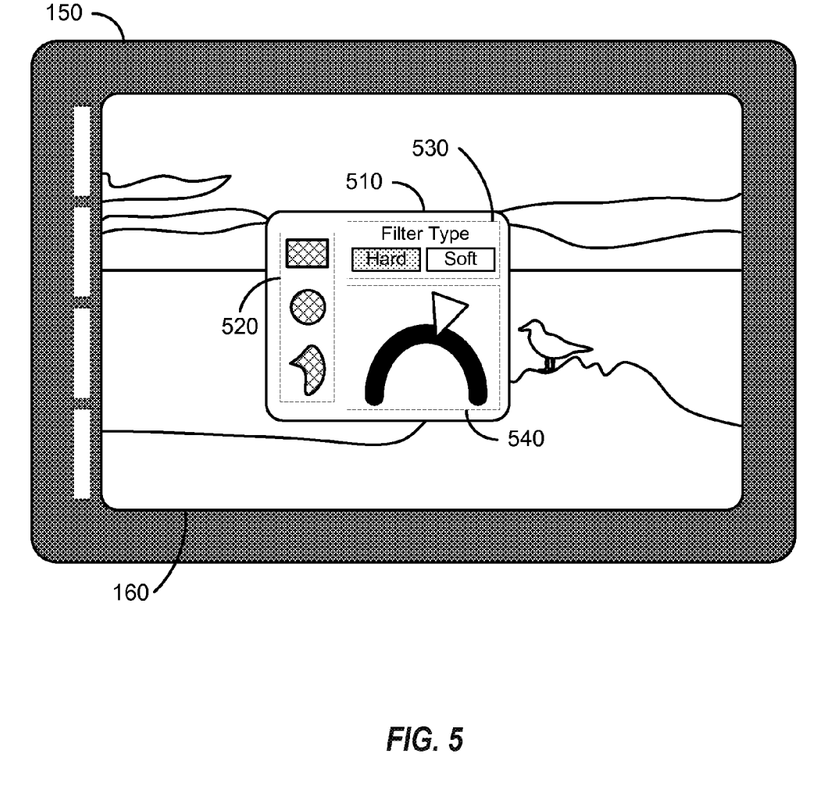
FIG. 5 illustrates a graphical user interface (GUI) for providing a software-implemented GND filter in accordance with a particular implementation.

In block 420, software-implemented GND filter options are provided with which the user may specify various characteristics of the software-implemented GND filter. FIG. 5 illustrates an example of a graphical user interface (GUI) for specifying software-implemented GND filter characteristics in accordance with a particular implementation. Presentation of GUI 630 may be triggered by a variety of mechanisms. For example, a user selects a button on a camera software GUI to display GUI 530. In another implementation, a user presses a physical button on electronic device 150. In another implementation, the user invokes GUI 530 by placing his hand, or any other object, within field of view 140 of the camera lens of the image capture system of electronic device 150. The placement of a hand, or a particular orientation of the hand within field of view 140 (e.g., shading the lens), may be detected (e.g., using the image capture system) and electronic device 150 then provides GUI 530.

In FIG. 5, GUI 530 provides a variety of options for specifying characteristics associated with a software-implemented GND filter. One such option includes designating portions of the displayed scene to be subject to the software-implemented GND filter. That is, the user is able to define, or select, portions of the displayed scene that correspond to the software-implemented GND filter. For example, shapes 520 provides geometric shapes to be dragged and dropped on the display to define the respective portions of the GND filter.

Referring again to FIG. 4, in block 430, separate portions of the displayed scene are defined. For example, shapes 520 of GUI 530 include a rectangle that may be used to overlay rectangular-shaped areas of the displayed scene. Shapes 520 also include a circle that may be used to define a circular area of the displayed scene. For example, a circle might be placed on a similarly shaped object in the scene, such as a person's face. Once placed, these shapes may be altered, oriented and/or scaled (e.g., using a variety of touch-screen gestures) to fit a desired portion of the displayed scene. According to some implementations, free-form shapes may also be drawn on the displayed scene (e.g., with a finger or stylus). For example, a user may draw around the seagull in foreground 130 in the visual representation to create a portion shaped like the seagull. Accordingly, software-implemented GND filters implemented as described herein may provide more flexibility relative to the geometric limitations of physical GND filters.

Referring again to the scene depicted in FIG. 1, the sky in visual representation 160 (i.e., the displayed scene) may be defined as one portion of the displayed scene with a rectangular shape. The rest of the displayed scene (e.g., including the beach, the ocean and the seagull) may be defined as another portion of the visual representation; achieving the effect illustrated, for example, in FIG. 2C.

Figure 6A:
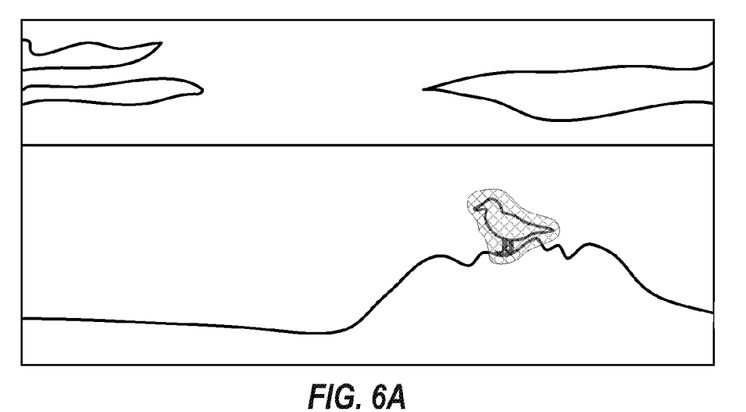
FIGS. 6A and 6B illustrate defining portions of a displayed scene in accordance with particular implementations.
Figure 6B:
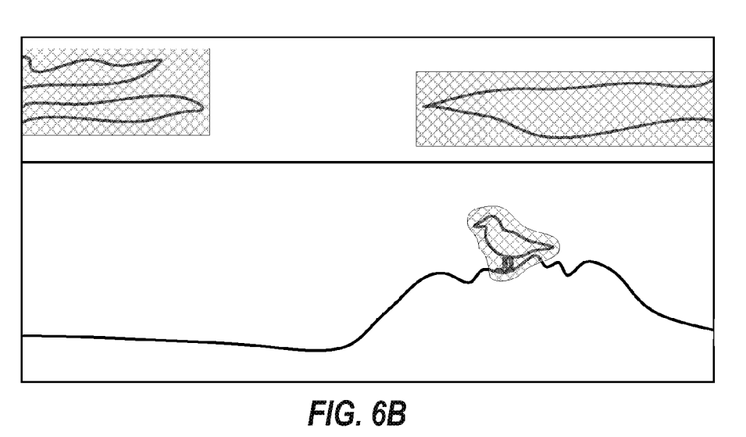

In other examples, the portions of the displayed scene may be defined to be more than two in number and/or may conform to an assortment of shapes and sizes. For example, in FIG. 6A, only the seagull is selected as one portion of the displayed scene and the remainder of the displayed scene is the second portion. In another example shown in FIG. 6B, multiple portions of the displayed scene are defined; two rectangular portions associated with the clouds in the sky, and an irregularly-shaped portion associated with the seagull.

Figure 7A:
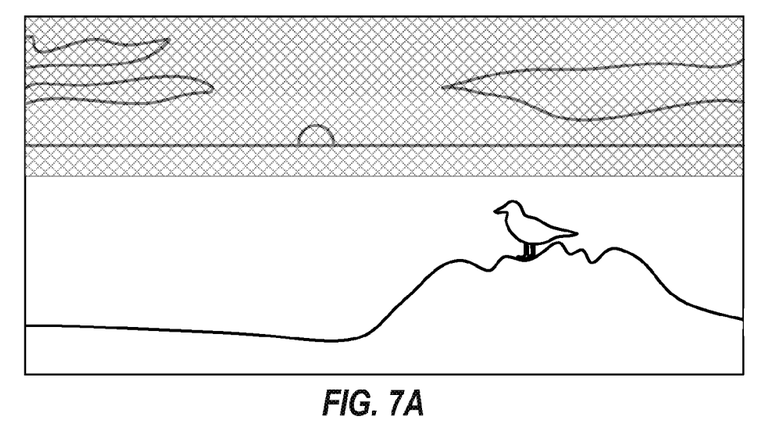
FIGS. 7A and 7B illustrate specification and adjustment of GND filter characteristics in accordance with particular implementations.
Figure 7B:
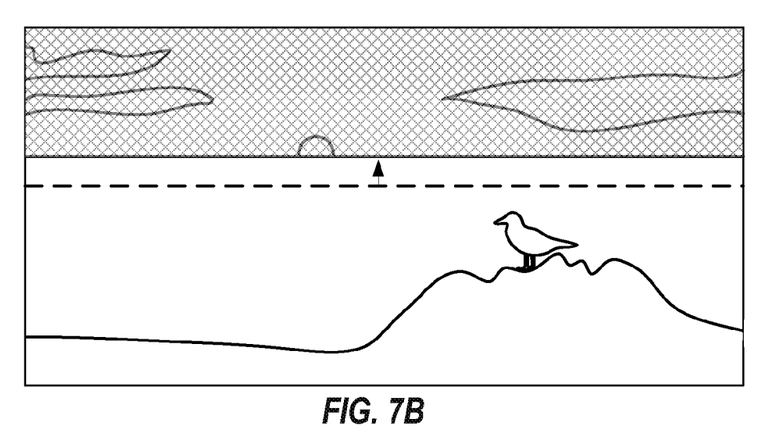

FIGS. 7A and 7B illustrate specification and adjustment of GND filter characteristics in accordance with particular implementations. In particular, these figures illustrate adjustment of the size of the different defined portions of the displayed scene on the device display. For example, in FIG. 7A, the darker portion in the upper part of the display covers a portion of the displayed scene beneath the horizon. In FIG. 7B, the size of the darker portion may be adjusted, for example, by selecting the darker portion on a touchscreen and resizing the darker portion to only cover the portion of the displayed scene above the horizon. Additionally, the orientations of the portions may be adjusted, for example, by selecting and rotating them.

According to some implementations, the portions of a displayed scene associated with a software-implemented GND filter may be determined automatically by electronic device 150 and then optionally adjusted by a user. For example, in FIG. 7B, the horizon might be determined by the device as a likely dividing point between separate portions of the displayed scene. That is, the area above the horizon may be very bright due to the sun while the area below the horizon is much darker. Therefore, the portions of the displayed scene may be initially determined based on light measurements of different portions of the scene by the device (e.g., using the image capture system, an ambient light sensor, etc.). If, upon inspection the user wants to slightly adjust the automatically defined portions, they may be resized. For example, the user may resize the portion in FIG. 7B to extend slightly below the horizon and cover a portion of the ocean, such as in FIG. 7A.

According to some implementations, separate portions of the displayed scene may be defined by placing an object within the field of vision of the camera lens. For example, a hand may be placed within field of vision 140 of the image capture system of electronic device 150. The hand is detected and the portion of the scene that is covered by the hand in field of view 140 may be used to define the corresponding portion of the displayed scene.

Figure 8A:
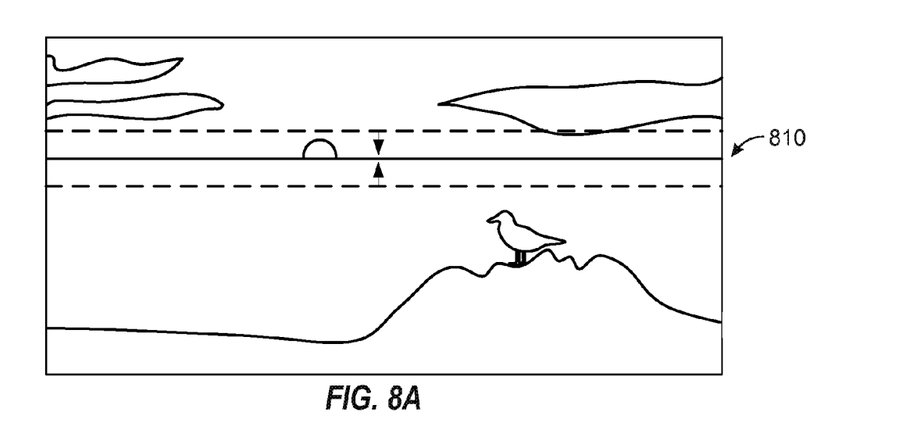
FIGS. 8A and 8B illustrate defining portions of a displayed scene in accordance with particular implementations.
Figure 8B:
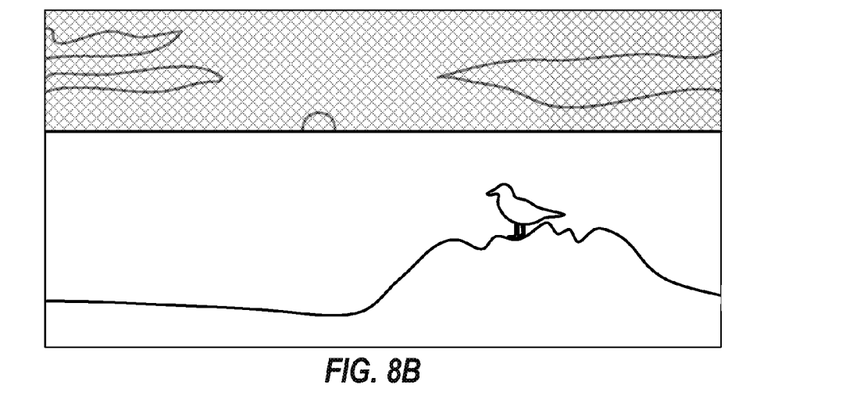

In a particular implementation, the portion of the displayed scene defined with reference to the placement of a hand or other object may be automatically adjusted by the device. For example, as discussed above, a horizon is recognized as a likely dividing point between portions (e.g., brightly-lit and poorly-lit) of a displayed scene. When a user places his hand in the field of view but not precisely at the horizon (e.g., within zone 810 of FIG. 8A), the portions of the displayed scene may still be defined as shown in FIG. 8B. That is, even if the hand is placed slightly above or below the horizon, the darker portion may be "snapped" to the horizon as recognized by the device.

Referring again to FIG. 4, in block 440, selection of GND filter characteristics is enabled. This may be accomplished, for example, using GUI 530 of FIG. 5 which includes options for selecting or specifying filter characteristics for filter type 510 and filter strength 540.

Filter type 510 allows the user to select between a "hard" GND filter and a "soft" GND filter. A soft GND filter is characterized by a relatively gradual transition between the different portions of the filter. A hard GND filter is characterized by a more abrupt transition between the different portions of the filter. A hard GND filter is useful when there is an abrupt change in brightness in a scene. A soft GND filter is useful when there is a more gradual change in brightness in the scene.

In some implementations, the nature of the transition between portions of the displayed scene used to specify a software-implemented GND filter can be specified and/or adjusted. For example, if the darker portion of the filter is initially placed to cover background 120, a transition portion of the darker portion may be defined to include 10% of the total area of the darker portion, while the remaining 90% of the darker portion might be configured for uniform light reduction (e.g., by 50%). By contrast, the transition portion might be characterized by different regions of light reduction, e.g., starting at 50% at the edge of the darker portion of the filter and down to 0% at the lighter portion of the filter. Using the touchscreen of electronic device, the relative sizes of these portions of the filter may be adjusted. For example, the transition portion might be increased to cover 20% of the total area of the darker portion.

Filter strength 540 (represented by a selection of a power in a meter) allows the user to specify the "power" or "strength" of the software-implemented GND filter in terms of opacity, transparency, f-stops, or any other variable which may indicate a modification to the amount of light reduction by the software-implemented GND filter. For example, if the power of the software-implemented GND filter is in terms of opacity, 0% opacity for a portion of the filter may mean that no light reduction occurs for the corresponding portion of the scene. If opacity is 50% for a portion of the filter, half the light in the corresponding portion of the scene is reduced. If the opacity is 100% for a portion of the filter, all of the light in the corresponding portion of the scene is reduced such that no light is seen (i.e., the portion would be black).

Referring again to FIG. 4, in block 450, the values of pixels associated with the defined portion(s) of the displayed scene are adjusted to allow the user to preview the effects of the current GND filter option settings. In particular, as the portion(s) and characteristics of the GND filter are specified, the displayed scene is updated (possibly in real-time) to allow for a preview of how a photograph of the scene might turn out. For example, if the darker portion of the filter is defined to cover the sky above the horizon as in background 120 of FIG. 1, the various portions of the displayed scene are then modified based on the whether the filter is selected to be a hard GND filter or a soft GND filter, as well as the strength of the GND filter (e.g., 50% opacity).

In some implementations, the values of the pixels of the displayed scene are manipulated to reflect the current GND filter characteristics by modifying the pixel values in proportion to the strength of the GND filter. For example, if the opacity of the GND filter is specified to be 50%, then the pixel values in the portion of the displayed scene representing brightness are reduced by 50%. If the pixels are represented in the RGB (red, green, blue) color model as 255, 255, 255 (i.e., white), then the RGB values of the pixels are reduced by 50% to 127, 127, 127.

If a soft GND filter is specified, then the value of the pixels in the corresponding portion of the displayed scene are reduced by different amounts. For example, the top portion of the displayed scene (e.g., background 120) may be associated with a soft GND filter portion having a power specified at 75% opacity. However, because the filter is a soft GND filter, not all of the RGB values of the pixels in the top portion are reduced by 75%. Rather, as previously discussed, the soft GND filter may have a transition region with a gradient, or smooth transition, between the darker portion of the GND filter and the lighter portion. For example, the pixel values of the pixels at the top of the displayed scene corresponding to the darker portion of the filter may be reduced by 75%. By contrast, the pixel values for the pixels corresponding to the bottom of the darker portion of the GND filter may have a 1% reduction, with the pixel values for the pixels in between gradually decreasing from 75% to 1%.

According to various implementations, the amount of light in the different portions of a scene corresponding to the portions specified by the user (i.e., the portions of the displayed scene) as described above is determined and used to determine the aperture and/or shutter speed. The amount of light measured for the portion of the scene corresponding to the portion of the displayed scene subject to the software-implemented GND filter is modified based on the filter options. Referring again to FIG. 4, in block 460, camera aperture and shutter speed settings of the image capture system are set. In particular, once at least one portion of the displayed scene is defined, and the filter characteristics are selected, the amount of light for portions of the scene corresponding to the portions of the displayed scene is measured (e.g., with an image sensor of image capture system 306(5)), and used to calculate the aperture and/or shutter speed to provide for the best exposure of the photograph. The calculations may be based on a weighted average of the areas of the respective filter portions. For example, if the darker portion of the GND filter covers 40% of the displayed scene, then 40% of the weighted average is based on the amount of light from the scene corresponding to that filter portion. The lighter portion of the GND filter may cover 60% of the displayed scene, and therefore represent 60% of the weighted average. The weighted average can also be based on the amount of light from more than two portions of the scene. For example, two portions of a displayed scene may be defined, each having different GND filter characteristics. A third portion is the portion of the displayed scene associated with the lighter or transparent portion of the GND filter. Each of the three portions may cover a different amount of area of the displayed scene, and therefore represent a different contribution to the weighted average.

Figure 9A:
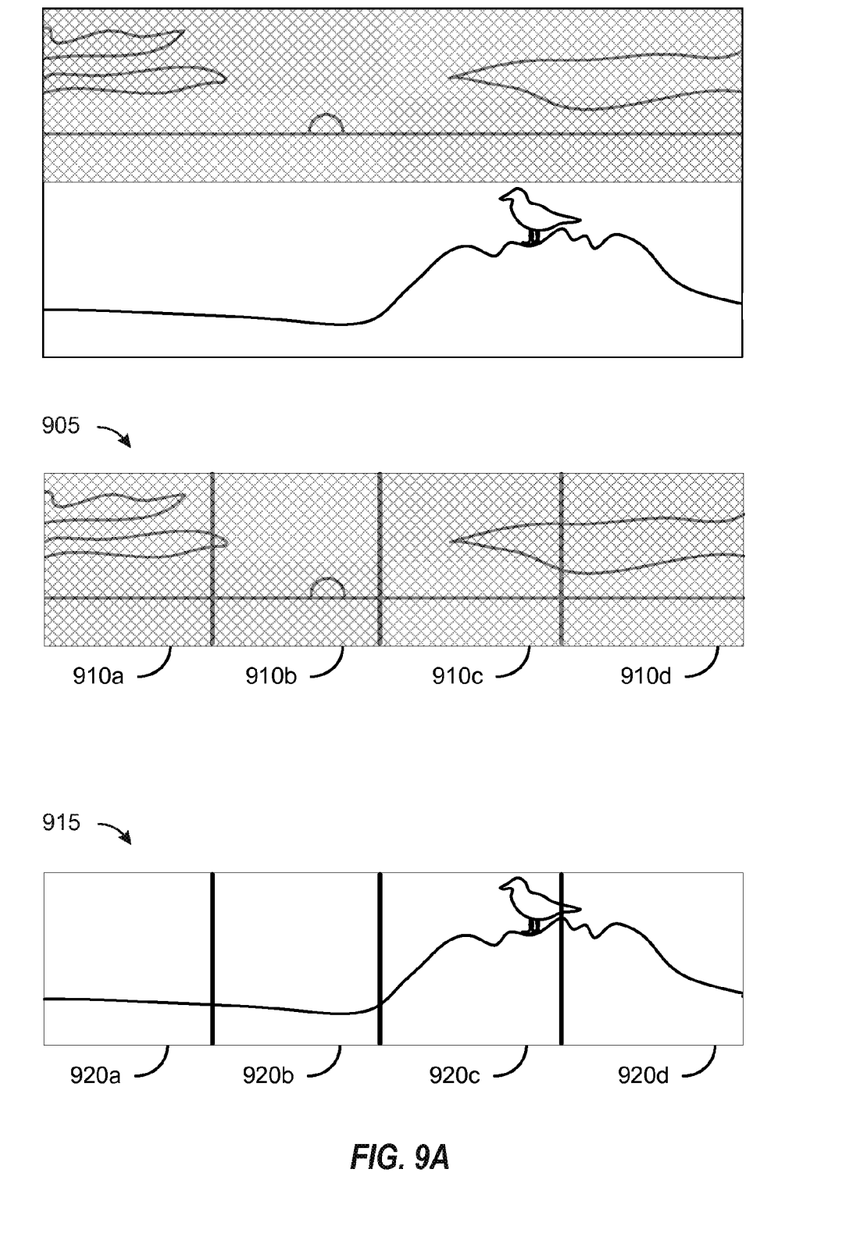
FIGS. 9A and 9B illustrate metering different portions of a scene in accordance with particular implementations.
Figure 9B:
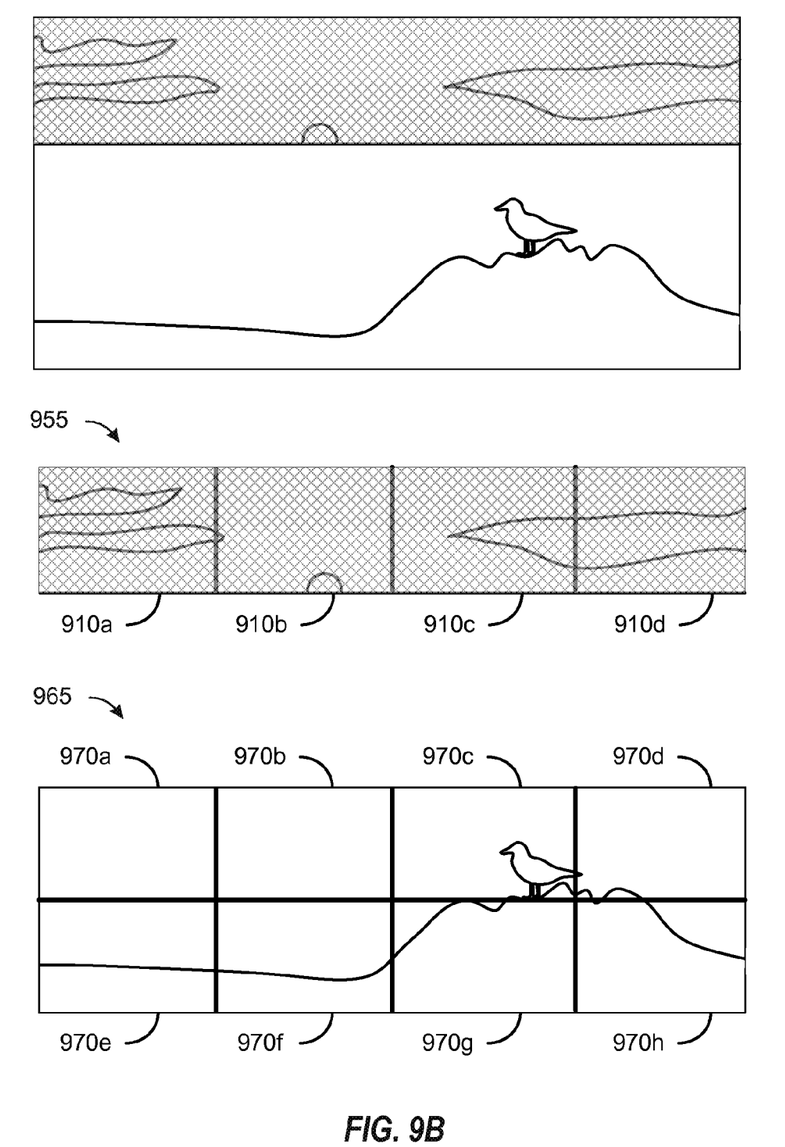

FIGS. 9A and 9B illustrate metering the light associated with different portions of a scene in accordance with particular implementations. In FIG. 9A, 50% of the displayed scene (905) corresponds to a darker portion of a software-implemented GND filter, while the other 50% (915) corresponds to the lighter portion of the software-implemented GND filter. That is, the displayed scene is evenly split between the two portions. Accordingly, the amount of light in the portions of the scene corresponding to each portion in the displayed scene is evenly used in the weighted average described above because each portion of the displayed scene covers the same amount (e.g., the same number of pixels, or the same area).

The portion of the scene corresponding to portion 905 is divided into separate regions and the light in each region is measured and averaged into a single value. For example, the amount of light in regions 910a, 910b, 910c, and 910d is measured, or metered, and an average based on the four regions is determined. The amount of light measured is adjusted, for example, based on the GND filter characteristics, as previously discussed. As an example, if the GND filter is a hard GND filter that specifies the amount of light is to be reduced by 50% throughout the portion of the scene and the amount of light is measured to be 255 on a scale of 0-255, then an adjusted amount of light value of 127 is calculated (i.e., the amount of light corresponding with portion 905 is 50% of the amount of light corresponding to portion 905 if no software-implemented GND filter was applied).

Likewise, the portion of the scene corresponding to portion 915 is also divided into separate regions and the light in each region is measured and averaged into a single value. For example, the amount of light in regions 920a, 920b, 920c, and 920d is measured and an average based on the four regions is determined. The values generated for portion 905 (i.e., the adjusted amount of light value based on the software-implemented GND filter characteristics) and portion 915 are then combined into a weighted average. Since both portion 905 and portion 915 cover 50% of the area of the displayed scene, both portion 905 and portion 915 contribute equally to the weighted average.

The weighted average of the amount of light is then used to generate settings for the camera. For example, the weighted average may be provided to a digital signal processor (DSP) or another component of image capture system 306(5) and used to generate settings for the aperture and/or shutter speed of the camera. That is, the aperture setting and/or the shutter speed setting are determined based on light measurements that are modified in accordance with the specified characteristics of the software-implemented GND filter, and then used to capture a photograph with a better exposure than camera settings derived with conventional light metering. In some implementations, both the aperture and shutter speed settings are generated. In other implementations, the user can fix one of the aperture or shutter speed settings and the other setting is generated. For example, the user can set the aperture to a fixed setting and the weighted average of the amount of light is then used to generate the shutter speed that can be used with the fixed aperture setting to capture the photograph with better exposure.

In another example illustrated in FIG. 9B, 33.3% of the displayed scene is associated with the darker portion of a GND filter while the remaining 66.7% of the displayed scene is associated with the lighter portion of the GND filter, i.e., the displayed scene is not evenly split between the two portions. Accordingly, the amount of light in the scene corresponding to each portion of the displayed scene contributes differently to the weighted average. For example, portion 965 contributes more to the weighted average than portion 955. In particular, portion 965 contributes 66.7% of the weighted average and portion 955 contributes 33.3% of the weighted average.

The portion of the scene corresponding to portion 955 is divided into separate regions and the light in each region is measured and averaged into a single value. For example, the amount of light in regions 960a, 960b, 960c, and 960d is measured and an average based on the four regions is determined. In particular, the amount of light measured is adjusted based on the specified GND filter characteristics, as previously discussed.

Likewise, the portion of the scene corresponding to portion 965 is also divided into separate regions and the light in each region is measured and averaged into a single value. For example, the amount of light in regions 970a, 970b, 970c, 970d, 970e, 970f, and 970g is measured and an average based on the eight regions is determined. The values generated for portion 955 and portion 965 are then combined into a weighted average. Since portion 955 covers 33.3% of the area of the displayed scene, portion 955 contributes 33.3% of the weighted average. The remaining 66.7% of the weighted average is based on portion 965. The weighted average of the amount of light is then used to generate settings (e.g., aperture and/or shutter speed) for the camera.

In block 470 of FIG. 4, a photograph of the scene is captured using the camera settings (e.g., aperture and/or shutter speed) and the captured photograph is stored in memory (e.g., memory 310 of electronic device 150 of FIG. 3).

The examples of the software-implemented GND filter discussed above include determining camera settings by reducing the amount of light measured in the portion of the scene as specified by the filter options. However, the camera settings can also be determined by increasing the amount of light measured. For example, filter strength 540 can indicate an increase in the amount of light measured. If the amount of light measured is 200 on a 0-255 scale, then it can be increased to 220 based on the filter options such as filter strength 540.

As will be appreciated by those of skill in the art, because the weighted average determined from the GND filter characteristics is used to generate the aperture and/or shutter speed settings, the photograph may have better exposure balancing than without the use of a software-implemented GND filter.

Software-implemented GND filters can be used for different scenes needing different shapes, sizes, orientations, and/or powers of GND filters. The GND filter for each scene can be generated to suit conditions and intended desired level of detail. Additionally, different GND filter characteristics may be applied to various portions of the scene. Accordingly, carrying numerous and cumbersome physical GND filters can be avoided.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details.

What is claimed is:

1. A computer-implemented method, comprising:
    displaying in real time on a display of a mobile device, a visual representation of a scene within a field of view of a camera of the mobile device;
    providing a graduated neutral density (GND) filter option on the display of the mobile device in conjunction with the visual representation of the scene;
    receiving a selection of the GND filter option;
    receiving GND filter portion input representing two portions of the visual representation of the scene;
    receiving a GND filter characteristic representing an amount of light reduction corresponding to one of the two portions of the visual representation of the scene;
    adjusting in real time brightness of the visual representation of the scene in response to the GND filter portion input and the GND filter characteristic;
    determining one or both of an f-stop setting and a shutter speed for the camera based on the GND filter portion input and the GND filter characteristic, wherein one or both of the f-stop setting and the shutter speed are determined based on a weighted average corresponding to a first amount of light associated with a first portion of the scene corresponding to a first portion of the two portions of the visual representation and a second amount of light associated with a second portion of the scene corresponding to a second portion of the two portions of the visual representation; and
    capturing an image of the scene with the camera using the f-stop setting and the shutter speed.

2. The computer-implemented method of claim 1, wherein the received GND filter portion input representing two portions of the visual representation of the scene is based on a light measurement of the scene, wherein a first portion of the two portions corresponds to a brighter portion of the visual representation of the scene and a second portion of the two portions corresponds to a darker portion of the visual representation of the scene, the light measurement indicating the brighter portion being brighter than the darker portion.

3. The computer-implemented method of claim 1, wherein adjusting the brightness of the two portions includes modifying values of pixels of the display corresponding to at least one of the two portions of the visual representation using the GND filter characteristic.

4. The computer implemented method of claim 1, wherein the first amount of light contributing to the weighted average based on a percentage of the visual representation associated with the first portion of the two portions of the visual representation, the second amount of light contributing to the weighted average based on a percentage of the visual representation associated with the second portion of the two portion of the visual representation of the scene.

5. An electronic device, comprising:
    an image capture system;
    one or more processors; and
    memory storing instructions, wherein the processor is configured to execute the instructions such that the processor and memory are configured to:
        receive a filter portion input representing two portions of a visual representation of a scene captured by the image capture system;
        receive one or more filter settings for at least one of the two portions; and
        determine camera settings for the image capture system based on light measurements corresponding to the two portions of the visual representation of the scene and the one or more filter settings.

6. The electronic device of claim 5, wherein the two portions of the visual representation of the scene are determined based on a light measurement of the scene.

7. The electronic device of claim 5, further comprising a display, the one or more processors and memory being further configured to:
    display, on the display of the electronic device, the visual representation of the scene captured by the image capture system; and
    adjust brightness of the visual representation of the scene based on the two portions of the visual representation of the scene and the one or more filter settings.

8. The electronic device of claim 7, wherein adjusting the brightness of the visual representation includes modifying values of pixels of the visual representation proportional to a filter strength specified in the filter settings.

9. The electronic device of claim 5, wherein the camera settings include one or both of aperture and shutter speed, and wherein one or both of the aperture and the shutter speed are determined based on a first light amount associated with a first portion of the scene corresponding to a first portion of the two portions of the visual representation and a second light amount associated with a second portion of the scene corresponding to a second portion of the two portions of the visual representation.

10. The electronic device of claim 9, wherein one or both of the aperture and the shutter speed are determined based on a weighted average of the first light amount and the second light amount, wherein the first light amount contributes to the weighted average based on a percentage of the visual representation associated with the first portion of the two portions of the visual representation, and the second light amount contributes to the weighted average based on a percentage of the visual representation associated with the second portion of the two portions of the visual representation of the scene.

11. The electronic device of claim 5, the one or more processors and memory further configured to:
    capture an image of the scene with the image capture system using the camera settings.

12. The electronic device of claim 5, wherein the characteristics of the filter include a type of filter and a power of the filter.

13. A computer program product, comprising one or more non-transitory computer-readable media having computer program instructions stored therein, the computer program instructions being configured such that, when executed by one or more computing devices, the computer program instructions cause the one or more computing devices to:
    receive a filter portion input representing two portions of a visual representation of a scene captured by an image capture system;
    receive one or more filter settings for at least one of the two portions; and
    determine camera settings for the image capture system based on two or more light measurements corresponding to the two portions of the visual representation of the scene and the one or more filter settings.

14. The computer program product of claim 13, wherein the two portions of the visual representation of the scene are determined based on a light measurement of the scene.

15. The computer program product of claim 13, wherein the one or more computing devices includes a display, and wherein the computer program instructions are further configured to cause the one or more computing devices to:

display, on the display of the one or more computing devices, the visual representation of the scene captured by the image capture system; and     adjust brightness of the visual representation of the scene based on the two portions of the visual representation of the scene and the one or more filter settings.

16. The computer program product of claim 15, wherein adjusting the brightness of the visual representation includes modifying values of pixels of the visual representation proportional to a filter strength specified in the filter settings.

17. The computer program product of claim 13, wherein the camera settings include one or both of aperture and shutter speed, and wherein one or both of the aperture and the shutter speed are determined based on a first light amount associated with a first portion of the scene corresponding to a first portion of the two portions of the visual representation and a second light amount associated with a second portion of the scene corresponding to a second portion of the two portions of the visual representation.

18. The computer program product of claim 17, wherein one or both of the aperture and the shutter speed are determined based on a weighted average of the first light amount and the second light amount.

19. The computer program product of claim 18, wherein the first light amount contributes to the weighted average based on a percentage of the visual representation associated with the first portion of the two portions of the visual representation, and the second light amount contributes to the weighted average based on a percentage of the visual representation associated with the second portion of the two portions of the visual representation of the scene.

20. The computer program product of claim 13, wherein the characteristics of the filter include a type of filter and a power of the filter.

\* \* \* \* \*